Dec. 4, 1951 L. DUFOUR 2,577,237
TRACTOR FOR AGRICULTURAL OR ROAD WORK
Filed Sept. 5, 1945 3 Sheets-Sheet 1
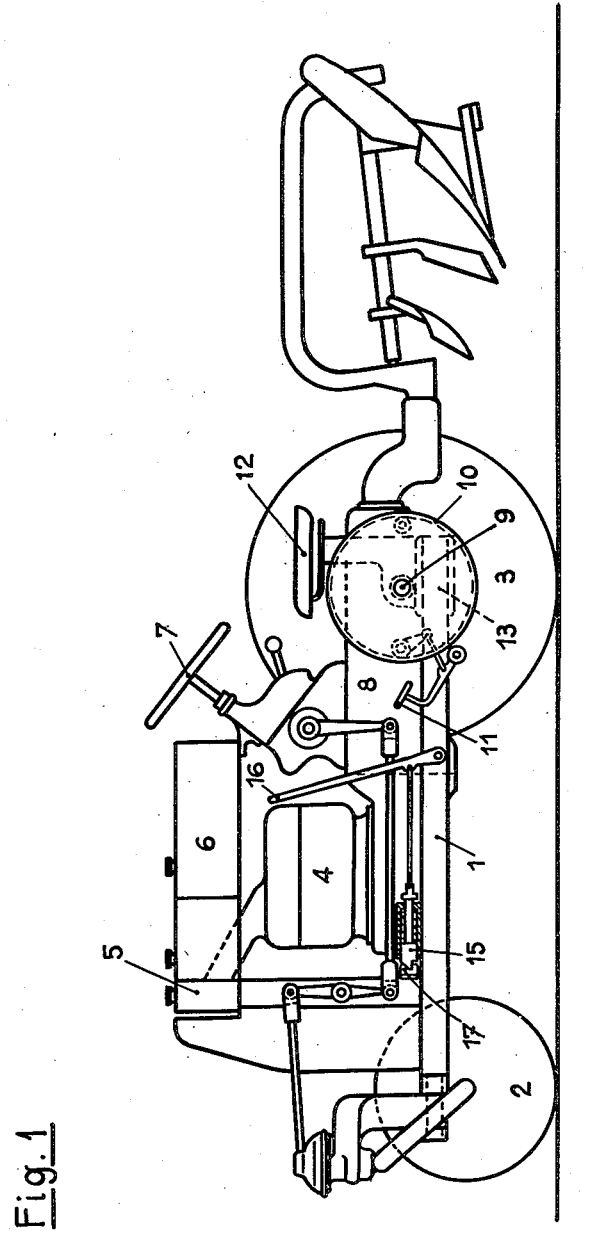
Fig.1
INVENTOR
LEON DUFOUR,
BY
ATTORNEY

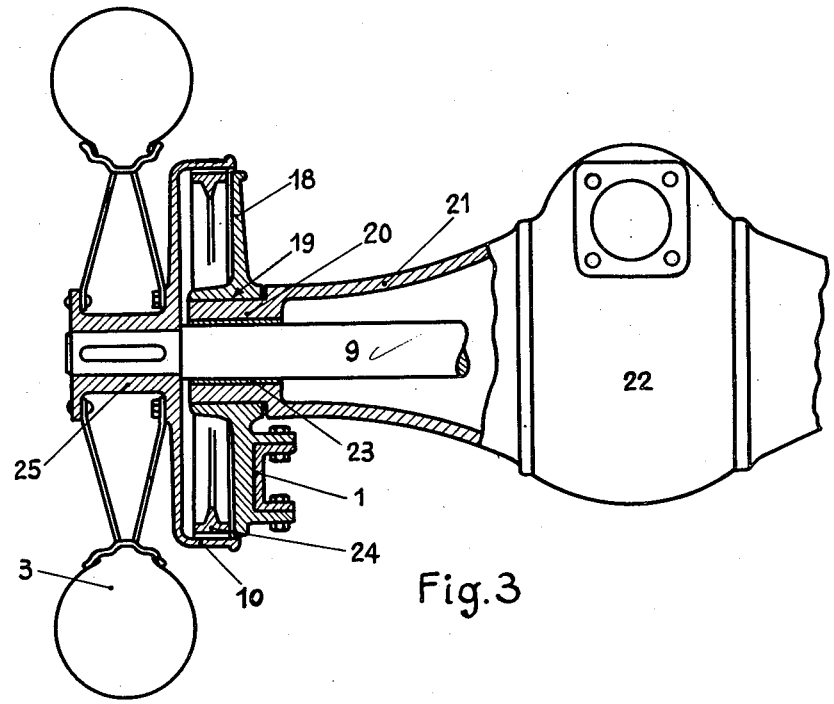
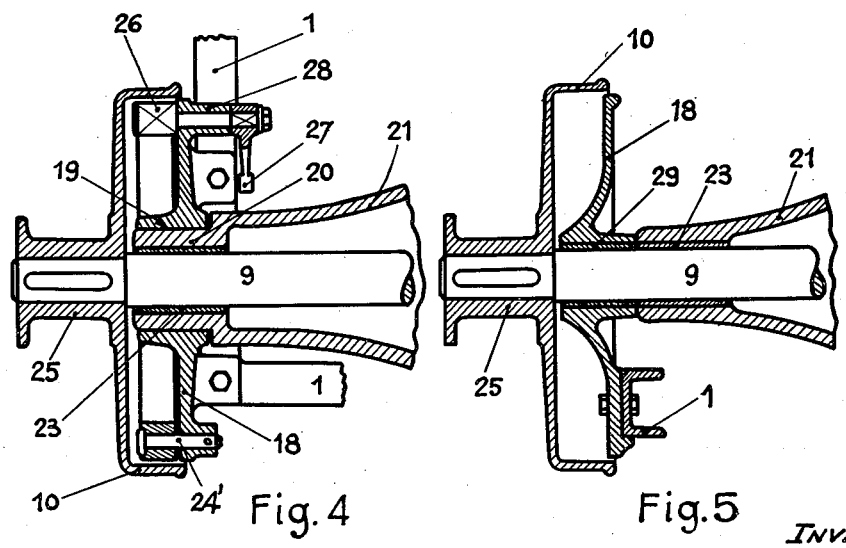
Fig. 3
Fig. 4
Fig. 5
INVENTOR
LEON DUFOUR,

Patented Dec. 4, 1951

2,577,237

UNITED STATES PATENT OFFICE 2,577,237

TRACTOR FOR AGRICULTURAL OR ROAD WORK

Leon Dufour, Geneva, Switzerland

Application September 5, 1945, Serial No. 614,507
In Switzerland November 21, 1944

10 Claims. (Cl. 97—50)

Designs have been proposed in the past for a tractor for agricultural or for road work comprising two main parts, one of which being tiltable in a vertical plane with respect to the other around the axis of the driving wheels or around an axis parallel and close to the axis of the driving wheels. The stationary part, stationary during this relative motion, comprises a frame or chassis carrying on its rear the driving wheels of the tractor and on its front end the guiding wheel or wheels. It is equipped also with the usual driver's seat. The tiltable or pivoted part constitutes a two arm rocking beam. The front arm carries the motor together with all its accessory parts such as fuel tank, radiator, air cooling fan, etc., and the housings containing the complete mechanisms for gear shifting, backward drive and differential gear usual in tractors, that is the whole mechanism serving for the transmission of the power from the engine to the driving wheels. The agricultural machines or the devices used for the coupling of loads to be towed by the tractor are fastened to the rear arm of the rocking beam.

In such a tractor the tilting of the pivoted part is obtained, without any additional mechanism, through the mere rearing reaction due to the adhesion of the driving wheels to the ground. But, in such cases it is frequently wished to momentarily increase the tilting torque caused by said rearing reaction. For instance, when the tractor equipped with a plough, is at the start of a furrow, it would be desirable to press the plough heavily downward in order to cause it to reach immediately its correct depth in the soil. Or, at the end of a furrow, when the driver wishes to lift the plough by shifting in the backward drive, he will not obtain a rearing reaction strong enough to overcome the weight of the plough if the soil is inclined backward, the tractor being then pulled backward by its own weight.

It has already been suggested to make use of the application of the rear wheel brakes in order to increase the rearing reaction and impart an increase of energy for tilting the pivoted part of the tractor (Swiss Patent 191,773, French Patent 798,961, English Patent 464,900, U. S. Patent 2,058,964, etc.), but in the just mentioned patents, erroneous means only have been indicated to obtain this result. As a matter of fact, in these patents, only one form of design of the tractor has been described in which the pivoted part is rotatable around an axis parallel and close to that of the driving wheels. In the Swiss Patent 191,773 referring only to that particular form of design of the tractor, it has been precisely stated that the brake shoes were mounted on the chassis. Now, in such a case, the desired effect is unattainable because the whole brake moves with respect to the chassis when the pivoted part rotates around its axle, which is not coaxial with the rear wheels. If then the brake shoes were mounted on the chassis, they would prevent all tilting motion of the pivoted part. The brake shoes and their support, called the brake support, must be mounted therefore on the pivoted part of the tractor described in these patents; this means that they move bodily with the rear axle housing of the tractor and applying the brakes does not cause the desired tilting motion. Indeed, if the brakes mounted in such a manner are applied, the pivoted part shall be imparted by the friction of the brake drums in a rotation in the same direction as the driving of the rearing reaction. Thus, the stronger the wheels this direction being just opposite to that brakes are being applied, the more the tilting effect coming from the rearing reaction is being counteracted, which is just the opposite of the desired result. At the limit, when the brakes are jammed on the wheels, the engine shall be completely stopped, but the desired tilting shall not have taken place.

The present invention has for its object to provide tilting energy to the pivoted part when the brakes are applied to the driving wheels, thus avoiding the errors mentioned above. The invention consists in combining in such a tractor having a pivoted part two characteristics already known separately, but of which it was not ascertained as yet that the simultaneous action was necessary to cause the desired effect.

The invention consists in the designing of the pivoted part of the tractor in such a manner that it can rotate only around the axis of the rear driving wheels and in designing the brake shoe carriers or brake supports in such a manner as to be embodied in the stationary part of the tractor and not to the pivoted part. Under these conditions, the pivoted part shall be able to be tilted freely when the brakes are set. Applying the brakes on the stationary chassis shall increase the effect of the rearing reaction instead of counteracting it. The invention consists further in providing the central portion of the brake supports with journal bearings embracing the ends of the rear axle housing which is a component of the pivoted part of the tractor, and to fasten the chassis against these brake supports. Said ends of the rear axle housing must be on their outside concentric with the axis of the driving wheels. The pivoted part, in its tilted motion shall rotate at the same time around the axle of the driving wheels and around the internal face of the stationary journal bearings provided in the central portion of the brake supports. A slightly different design consists in arranging the journal bearing surfaces provided inside the brake supports in such a manner that they embrace directly both half axles of the driving wheels, outside and externally to the outer bearings of said half axles provided in the ends of the rear axle casing of the tractor. The pivoted part of the tractor would then rotate around the axle of the driving wheels alone. Another design would consist in locating the bearings inside the brake supports in the form of separate elements, and in clamping same against said supports taking proper care for their careful centering with respect to the bore. Lastly, the chassis may be fastened either directly against the brake supports or their bearings, or indirectly by means of intermediate shelves cast in one piece with the brake supports or their bearings, or still by means of intermediate separate shelves applied to the brake supports or to their bearings.

Figs. 1 to 6 of the annexed drawing, given here as examples, represent a tractor embodying the present invention as well as various details of its design;

Fig. 1 is a side view in elevation of a tractor at rest equipped with a carried plough, the pivoted part of the tractor resting on the chassis;

Fig. 3 is at a larger scale a partial cross section in a vertical plane of the rear axle assembly of the tractor with its left driving wheel, the whole being viewed from the back;

Fig. 4 is a cross section in a horizontal plane of the same rear axle assembly;

Fig. 5 is a cross section in a vertical plane of a portion of the rear axle assembly in which a slightly different form of design of the bearing for the pivoted part is shown;

Figure 6 is a cross sectional view in a vertical plane of another form of the present invention.

Figure 2:
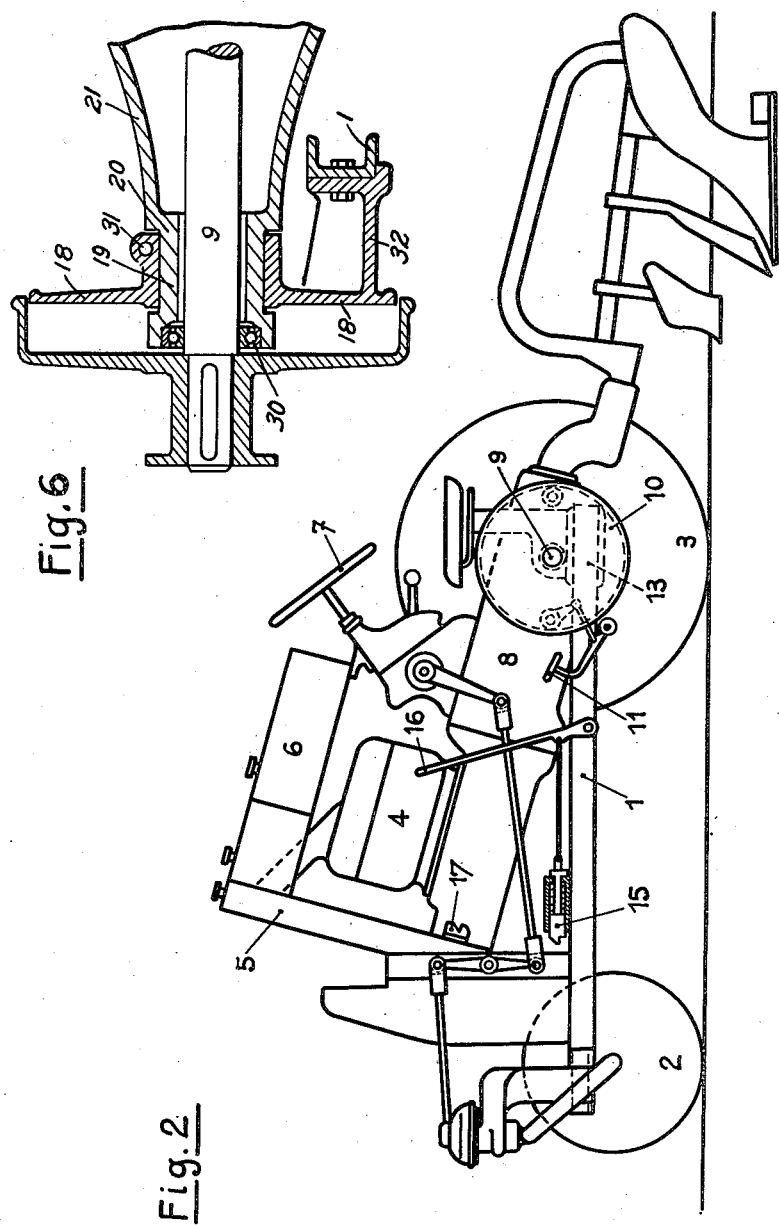
Fig. 2 is a side view of the same tractor in operation, the pivoted part being tilted, the plough being set in the soil.

In the Figures 1 and 2 the left front guiding wheel as well as the left rear driving wheel of the tractor are supposed to be removed for the sake of clarity. In the Figures 4, 5 and 6, the driving wheel has not been represented, but its hub is shown. In Figures 1 and 2, I is the chassis or stationary part of the tractor, having at the front, the guiding wheels 2 and at the rear the driving wheels 3. Numeral 4 represents the engine with its radiator 5 and its gasoline or oil tank 6. Numeral 7 is the steering wheel, located above the gear box 8 containing the clutch and the whole mechanism for speed changing and for the transmission of power from the engine to the rear wheels, differential gear included. Parts 4, 5, 6, 7, 8 make up the pivoted part of the tractor which is rotatable around the axle 9 of the driving wheels, being guided in a journal bearing (the details of which may be seen in the Figures 3 to 6) located inside the brake support 10. Thus the pivoted part may be termed a rocking beam having two arms, A and B, one on each side of the axle 9 around which it rocks, so as to tilt arm A with respect to the plane of the chassis 1 and arm B with respect to the ground surface at the rear of the tractor. The brake support is fastened to the chassis at 13. A pedal 11 allows the driver to actuate the brake acting directly on the driving wheels of the tractor. A pull on a lever 16 actuates a latch 15 mounted on the chassis thus liberating a notched keeper 17 on the pivoted part of the tractor. The plough carried at the rear being somewhat heavier than the engine with its accessory parts, the pivoted part shall tilt backwards and the tractor shall take the position shown in Fig. 2, in which like numerals represent like parts. If the tractor is in a forward driving position, the rearing reaction developed by the rear wheels in contact with the ground, will increase the tilting force of the pivoted part and will apply the plough strongly against the soil. In order to increase the force applying the plough against the soil, it is only necessary to press on the pedal 11 of the brake 10 of the rear driving wheels. Indeed, the rearing reaction increases with the action of the brakes on the driving wheels. Inversely, when the tractor is in reverse gear, the opposite rearing reaction will tend to bring the pivoted part back to its position shown in Fig. 1. But, if the ground slants slightly in the back, the tangential force exerted by the driving wheels on the soil will be small if not nil, and the rearing reaction will be too small to cause the lifting of the plough. It will be sufficient then to act on the pedal 11 of the brake of the driving wheels to create a strong reversed rearing reaction. The plough will be lifted immediately and the notched keeper on the hinged part will engage the latch 15 as shown in the Figure 1.

In Fig. 3, the brake support 18 has in its central portion a journal bearing 19 embracing the end 20 of the tubular end 21 of the rear axle housing 22 of the tractor. Said end 20 is machined exteriorly in order to present a surface precisely concentric with the axle 9. As the rear axle housing belongs to the pivoted part or rocking beam of the tractor, it will turn simultaneously with the beam around the axle 9 of the driving wheels and inside the bearing 19 provided in the central portion of the brake support 18. The chassis 1, shown here in the shape of a U is fastened directly against the brake support 18. The shoes 24 of the brake 10 are shown in cross section. The brake drum 10 and the hub 25 of the rear driving wheel 3 are one single piece. A key locks the axle 9 in the hub 25.

Fig. 4 represents the same details, but viewed as a horizontal cross section. The chassis 1 is shown from above. In this figure, one sees the pivoting axle 24' of the brake shoes, carried by the brake support 18 and also the spreading cam 26 for said shoes together with its control lever 27. The cam shaft rotates in a bearing 28 provided in the brake support 18.

Fig. 5 shows a slightly different arrangement in which the bearing 29 provided in the central portion of the brake support 18 embraces directly the extension of the axle 9, between the bearing 23 provided in the end of the horn 21 of the rear axle housing and the hub 25 of the rear driving wheel. With this arrangement, when the hinged part shall be tipped, it will rotate solely around the shaft 9 which rotates itself in the bearing 29 located centrally in the brake support 18.

Fig. 6 represents another arrangement in which the axle 9 rotates in a ball bearing (a roller bearing could naturally be used also) located in the end 20 of the horn 21 of the rear axle housing. The journal bearing 19 in which the hinged part of the tractor is pivoting is again provided in the central portion of the brake drum 18. Said brake support is of course made up of two halves, for mounting purposes, as the bearing 19 has a bore smaller than the outer housing of ball bearing 30. The bolt 31 indicates symbolically that the brake support is made up of two halves bolted together. The chassis 1 is fastened to the brake support 18 by means of an intermediate shelf 32 cast in one piece with the support 18.

While I have illustrated and described only three embodiments of my invention, it is to be expressly understood that the present invention is not to be strictly construed as being limited to the embodiments herein illustrated. For example, the scope of the appended claims in addition to covering these embodiments specifically are also of a scope adapted to cover a tractor having a tilting body, brake supports for brakes acting on the rear drive wheels, which are made as a part of the non-tilting chassis of the tractor and not as a part of the tilting part of the tractor like the prior art arrangements.

I claim:

1. In a tractor of the type consisting of a wheeled non-tilting chassis including rear drive wheels, a rigid elongated body mounted to rock on an axis coinciding with the axis of the rear drive wheels so as to tilt with respect to said non-tilting chassis, a power plant for said tractor mounted on the said body to one side of the said axis, a driving connection between said rear drive wheels and said power plant, a ground engaging implement carried by the body on the other side of said axis and trailing the said rear drive wheels, brake means for said drive wheels mounted on said non-tilting chassis, whereby tilting forces are imparted to said elongated rockably mounted body by the reaction from the force applied to the rear drive wheels by said power plant and the tilting torque around the rear wheel axle is increased when the brakes to the rear drive wheels are applied.

2. In a tractor of the type consisting of a wheeled chassis including rear drive wheels, a rigid elongated body mounted to rock on an axis coinciding with the axis of the rear drive wheels, a power plant for said tractor mounted on the said body to one side of the said axis, a driving connection between said rear drive wheels and said power plant, a ground engaging implement carried by the body on the other side of said axis and trailing the said rear drive wheels, means for retaining the power plant end of said body connected to the chassis in non-rocking position, to thereby hold said implement raised above the surface of the ground, brake means for said drive wheels mounted on said non-tilting chassis, whereby tilting forces are imparted to said elongated rockably mounted body by the reaction from the force applied to the rear drive wheels by said power plant and the tilting torque around the rear wheel axle is increased when the brakes to the rear drive wheels are applied.

3. A tractor for non-wheeled ground engaging implements comprising two main parts, one of said parts being a wheel supported chassis having a rear drive axle, and the other part comprising a beam medially pivoted on said axle and tiltable with respect to the plane of said chassis, said beam supporting the tractor power plant in front of the axle and the said ground engaging implements to the rear of the axle, a driving connection between said power plant and said rear drive axle, brake means for said drive wheels mounted on said non-tilting chassis, whereby tilting forces are imparted to said elongated rockably mounted body by the reaction from the force applied to the rear drive wheels by said power plant and the tilting torque around the rear wheel axle is increased when the brakes to the rear drive wheels are applied.

4. A tractor for non-wheeled ground engaging implements comprising two main parts, one of said parts being a wheel supported chassis having a rear drive axle, and the other part comprising a beam medially pivoted on said axle and tiltable with respect to the plane of said chassis, said beam supporting the tractor power plant in front of the axle and the said ground engaging implements to the rear of the axle, a driving connection between said power plant and said rear drive axle, means for tilting the beam on said axle teeter-fashion to engage said implements with the ground, latch means for retaining said beam non-tilted in the same plane with the chassis, brake means for said drive wheels mounted on said non-tilting chassis, whereby tilting forces are imparted to said elongated rockably mounted body by the reaction from the force applied to the rear drive wheels by said power plant and the tilting torque around the rear wheel axle is increased when the brakes to the rear drive wheels are applied.

5. A tractor comprising a chassis, ground engaging wheels mounted at the front and rear ends of said chassis, a rear axle mounted transverse the chassis and having a driving wheel journalled on each end thereof, a brake drum on each of said rear wheels, brake shoes supported on said chassis, means for engaging said brake shoes with their respective brake drums, a body part tiltable with respect to the said chassis pivoted on said rear axle so that the front part thereof swings vertically above the chassis and the rear part thereof swings vertically above the ground back of the rear wheels of the tractor, said front part supporting the power plant of the tractor and said rear part supporting ground tilling means, a driving connection between said power plant and the said rear axle, latch means mounted on said chassis and said front part of the tiltable body, means adapted to release said latch means to thereby permit said body to tilt and engage the said tilling means with the ground at the rear of the tractor, and brake supports on the chassis for supporting the brakes acting on the rear wheels, whereby, the force of said tilting action of the tiltable body part is increased by the engagement of said brake shoes with the drums mounted on the drive wheels when forward tractive power is transmitted to the drive wheels to increase the normal tilting force applying the tilling means into the ground.

6. In a tractor of the type consisting of a wheeled chassis including rear drive wheels, a rigid elongated body mounted to rock on an axis coinciding with the axis of the rear drive wheels, a power plant for said tractor mounted on the said body to one side of the said axis, a driving connection from the power plant to the said drive wheels, a ground tilling implement relatively heavier than said power plant carried by the said body on the other side of said axis, whereby the weight of said implement tends to rock said body angularly with respect to the non-rockable wheeled chassis, and friction means having cooperating parts mounted for engagement with each other on said chassis and said drive wheels to produce a brake torque to allow a tilting torque produced by the drive wheels to be transmitted by the driving connection to a housing of the tiltable part journalled on the driving wheel axle.

7. In a tractor of the type having a wheeled chassis including rear drive wheels mounted on an axle, a housing journalled on said axle having tubular ends, a body constituting a tiltable rigid two arm rocking beam medially secured to said housing, the front arm of said beam having mounted thereon a power plant assembly for transmitting power to said rear drive wheels, the rear arm of said beam supporting ground tilling means adapted to engage with the ground when said beam rocks around the axis of said axle with said housing journalled thereon, brake supports mounted on said chassis, frictional brake shoes carried thereby, and brake drums on said rear wheels adapted to be engaged by said brake shoes, whereby transmission of power to said drive wheels from said plant and engagement of said brake shoes is effective to apply a force to tilt said beam with respect to the plane of the said chassis for lowering or raising said tilling means according to the direction of said power transmission to said wheels.

8. In a tractor of the type having a wheeled chassis including rear drive wheels mounted on half axle members, a housing journalled on said axle members having tubular ends, a body constituting a tiltable rigid two arm rocking beam medially secured to said housing, the front arm of said beam having mounted thereon a power plant assembly for transmitting power to said rear drive wheels, the rear arm of said beam supporting ground tilling means adapted to engage with the ground when said beam rocks around the axis of said axle members with said housing journalled thereon, brake supports mounted on said chassis having journal bearings in their central portions, frictional brake shoes carried thereby and brake drums on said rear wheels adapted to be engaged by said brake shoes, whereby transmission of power to said drive wheels from said plant and engagement of said brake shoes is effective to apply a force to tilt said beam with respect to the plane of the said chassis for lowering or raising said tilling means according to the direction of said power transmission to said wheels.

9. A tractor according to claim 8, in which the said brake supports of said rear wheel brakes are provided in their central portion with journal bearings, said journal bearings embracing directly said axle members of said driving wheels, outside of the outer bearings of said axle members borne by said tubular ends of said rear axle housing which belong bodily to said tiltable part of said tractor, in order that, during tilting motions, said tiltable part rotates solely around said axle members of said driving wheels.

10. A tractor according to claim 8, in which the brake supports of said rear wheel brakes are provided in their central portion with journal bearings, the unity of action of the chassis of said tractor with said brake supports including shelves to which said chassis is fastened, said shelves being formed in one piece with the brake supports.

LEON DUFOUR.

REFERENCES CITED

The following references are of record in the file of this patent:

UNITED STATES PATENTS

| Number | Name | Date |
| --- | --- | --- |
| 1,558,775 | Barras | Oct. 27, 1925 |
| 2,035,150 | Dufour | Mar. 24, 1936 |
| 2,058,964 | Dufour | Oct. 27, 1936 |